United States Patent
Kanaoka et al.

(10) Patent No.: US 7,645,534 B2
(45) Date of Patent: Jan. 12, 2010

(54) MEMBRANE ELECTRODE ASSEMBLY FOR SOLID POLYMER ELECTROLYTE FUEL CELL

(75) Inventors: Nagayuki Kanaoka, Saitama (JP); Hiroshi Sohma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 496 days.

(21) Appl. No.: 11/723,069

(22) Filed: Mar. 16, 2007

(65) Prior Publication Data
US 2007/0248865 A1 Oct. 25, 2007

(30) Foreign Application Priority Data
Apr. 25, 2006 (JP) ............................. 2006-120180

(51) Int. Cl.
*H01M 8/10* (2006.01)
(52) U.S. Cl. .......................................... 429/30; 429/33
(58) Field of Classification Search ................ 429/30, 429/33
See application file for complete search history.

(56) References Cited

U.S. PATENT DOCUMENTS 5,403,675 A 4/1995 Ogata et al.

FOREIGN PATENT DOCUMENTS

| DE | 699 33 129 T2 | 3/2007 |
|---|---|---|
| EP | 16119735 A1 | 1/2006 |
| EP | 1112301 B1 | 9/2006 |
| JP | 07-220741 A | 8/1995 |
| JP | 2001-342241 A | 12/2001 |
| JP | 2002-293889 A | 10/2002 |
| JP | 2004-137444 A | 5/2004 |
| JP | 2004-345997 A | 12/2004 |
| JP | 2004-346163 A | 12/2004 |

*Primary Examiner*—Jane Rhee
(74) *Attorney, Agent, or Firm*—Arent Fox LLP.

(57) ABSTRACT

A polymer electrolyte membrane-electrode assembly including a proton conductive membrane having superior workability is provided. The membrane-electrode assembly for solid polymer electrolyte fuel cells includes an anode electrode, a cathode electrode, and a proton conductive membrane, the anode electrode and the cathode electrode being disposed on opposite sides of the proton conductive membrane, in which the proton conductive membrane includes a polyarylene having the constitutional unit (S) expressed by the general formula (2-2) described below and the constitutional unit (T) expressed by the general formula (2-3) described below; the ratio s of the unit (S) in the polyarylene is 50 to 95 mole %, and the ratio t of the unit (T) is 5 to 50 mole % in the polyarylene, where s+t=100 mole %.

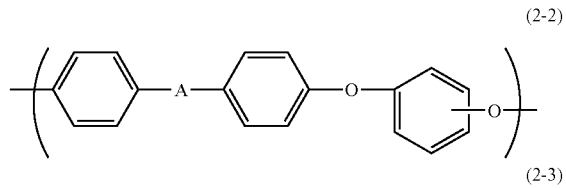

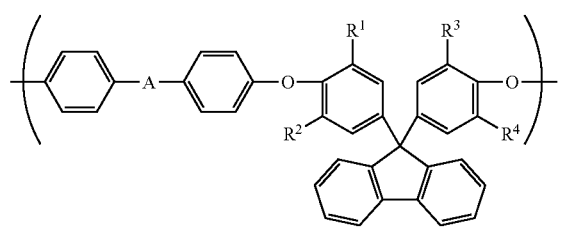

4 Claims, 6 Drawing Sheets

MEMBRANE ELECTRODE ASSEMBLY FOR SOLID POLYMER ELECTROLYTE FUEL CELL

This application is based on and claims the benefit of priority from Japanese Patent Application No. 2006-120180, filed on 25 Apr. 2006, the content of which is incorporated herein by reference.

BACKGROUND OF THE INVENTION

The present invention relates to a membrane-electrode assembly for solid polymer electrolyte fuel cells.

RELATED ART

Electrolytes are usually used in solutions, typically water solutions. However, in recent years, this continues to be replaced by increasing tendency to use electrolytes in a solid state. First, in processing instances, it is easily applied to electrical and electron materials. Second, it is lighter, more compact and converts into a reduction in power consumption.

The proton conductive materials conventionally have an inorganic or organic compound. Examples of inorganic compounds include uranyl phosphate hydrate. However, in the inorganic compound, there are many problems in forming the conductive layer on the electrode or substrate, since there is insufficient contact between the substrate and the electrode at their interface.

On the other hand, the organic compound includes a so-called cationic exchange polymer; for example, a sulfonated vinyl polymer such as polystyrene sulfonic acid, a perfluoroalkyl sulfonic acid polymer exemplified by Nafion (registered mark), Flemion (registered mark) and Aciplex (registered mark), or a perfluoroalkyl carboxylic acid polymer, as well as a polymer in which a sulfonic or phosphoric group is introduced in a heat resistant polymer such as polybenzoimidazole and polyetheretherketone.

Among these organic compounds, a perfluoroalkyl sulfonic acid polymer has higher oxidative resistance and proton conductivity and, therefore, is widely used as an electrolyte membrane in fuel cells.

Typically, in fuel cell production, the electrolyte membrane consisting of the perfluoroalkyl sulfonic acid polymer is placed between both electrodes, and then is subjected to hot pressing to obtain an electrode-membrane assembly. The heat distortion temperature of the fluorine system electrolyte membrane as described above is comparatively low at around 80 degrees Celsius so that it can easily adhere.

However, the temperature of the electrolyte membrane may be 80 degrees Celsius or more due to the reaction heat generated when the fuel cell generates electrical power. In this case, a creeping phenomenon occurs by which the electrolyte membrane softens and both electrodes short, resulting in no power generation. To avoid such a problem, a means in which the electrolyte membrane thickens while operating may be adopted, or the fuel cell may be designed so that the operational temperature is 80 degrees Celsius or less. However, these solutions are flawed in that the highest output power generation is limited.

To improve the low heat distortion temperature and inferior mechanical properties of the perfluoroalkyl sulfonic acid polymer at high temperatures, a solid polymer electrolyte membrane using an aromatic polymer that is used as an engineering plastic has been developed.

For example, in U.S. Pat. No. 5,403,675, a solid polymer electrolyte membrane consisting of a rigid sulfonated polyphenylene having a sulfonic acid group is disclosed. This polymer is obtained by synthesizing a precursor polymer mainly containing a constitutional unit introduced from an aromatic compound consisting of a phenylene chain, and then reacting the precursor polymer with a sulfonating agent.

However, the electrolyte membrane consisting of this polymer has superior creeping resistance, with a heat distortion temperature of 180 degrees Celsius; however, the electrolyte membrane is required to experience extremely high temperature when the electrolyte membrane is adhered to the electrodes by way of hot pressing. In addition, there are problems where the sulfonic acid group reacts to be eliminated or cross-linked, and also an electrode layer deteriorates when the electrolyte membrane is heated for extended periods of time.

In addition, in Japanese Unexamined Patent Application Publication No. 2004-137444, a polyarylene having a sulfonic acid group that is obtained from an aromatic compound having a fluorene skeleton is disclosed. However, there is a problem where this polymer has inferior adhesive workability to an electrode.

SUMMARY OF THE INVENTION

The object of the present invention is to provide a polymer electrolyte membrane-electrode assembly including a proton conductive membrane having superior workability.

As a result of vigorous efforts to achieve the objects, the inventors have found that the abovementioned problems are solved by providing the solid polymer electrolyte membrane-electrode assembly that includes a proton conductive membrane consisting of an aromatic compound and polyarylene in which two kinds of constitutional units are present in a predefined ratio. Specifically, the present invention provides the solid polymer membrane-electrode assembly as described below.

According to a first aspect of the present invention, a membrane-electrode assembly for solid polymer electrolyte fuel cells includes an anode electrode, a cathode electrode, and a proton conductive membrane, the anode electrode and the cathode electrode being disposed on opposite sides of the proton conductive membrane, in which the proton conductive membrane includes a polyarylene having the constitutional unit (S) expressed by the general formula (2-2) described below and the constitutional unit (T) expressed by the general formula (2-3) described below; the ratio s of the constitutional unit (S) in the polyarylene is 50 to 95 mole % and the ratio t of the constitutional unit (T) is 5 to 50 mole % in the polyarylene, where s+t=100 mole %.

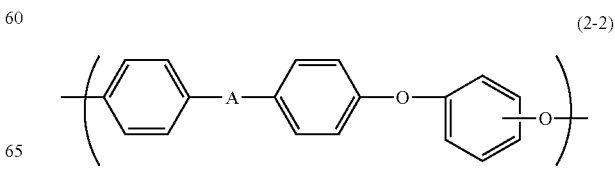

(2-2)

-continued

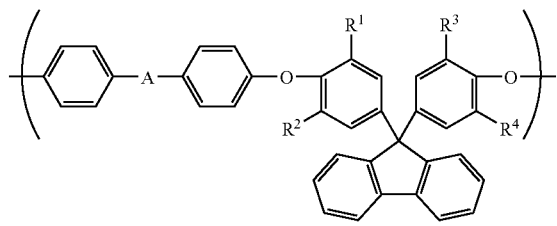
(2-3)

In the formulas, A independently represents at each occurrence a divalent linking group expressed by —CO— or —SO$_2$—, and R$^1$ to R$^4$ independently represent at each occurrence a hydrogen atom, fluorine atom, alkyl group, or aryl group.

According to a second aspect of the present invention, in the membrane-electrode assembly for solid polymer electrolyte fuel cells described in the first aspect of the present invention, the polyarylene further includes a constitutional unit (U) expressed by the general formula (3-3) described below.

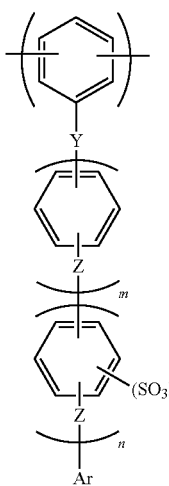
(3-3)

In the formula, Y represents at least one kind of divalent linking group selected from the group consisting of —CO—, —SO$_2$—, —SO—, —CONH—, —COO—, —(CF$_2$)$_p$— (p is an integer from 1 to 10) and —C(CF$_3$)$_2$—; Z independently represents at each occurrence a direct bond or at least one kind of divalent linking bond selected from the group consisting of —O—, —S—, —(CH$_2$)$_p$— (p is an integer from 1 to 10), and —C(CH$_3$)$_2$—; Ar represents an aromatic group having a sulfonate group; m is an integer from 0 to 10; n is an integer from 0 to 10; and k is an integer from 1 to 4.

According to a third aspect of the present invention, in the membrane-electrode assembly for solid polymer electrolyte fuel cells described in the first aspect of the present invention, the polyarylene has a number average molecular weight of 500 to 50000, and weight average molecular weight of 2000 to 600000.

According to a fourth aspect of the present invention, in the membrane-electrode assembly for solid polymer electrolyte fuel cells described in the second aspect of the present invention, the polyarylene has 0.001 to 90 mole % of the constitutional unit (U) based on the overall total amount of constitutional units.

According to the present invention, reducing the heat distortion temperature of the proton conductive membrane can be attempted by using a polyarylene that includes a constitutional unit introduced from an aromatic compound having a specified structure in a predefined ratio and a constitutional unit having a sulfonic acid group. Furthermore, the proton conductive membrane providing an efficient configuration of a hydrophilic group and a hydrophobic group, can obtain sufficient mechanical strength. By using this proton conductive membrane, the adhesiveness of the membrane-electrode interface is improved by way of heat processing treatment such as hot pressing so that the membrane-electrolyte assembly exhibits superior power generation performance and power generation durability at low electrical current density.

DETAILED DESCRIPTION OF THE INVENTION

Figure 1:
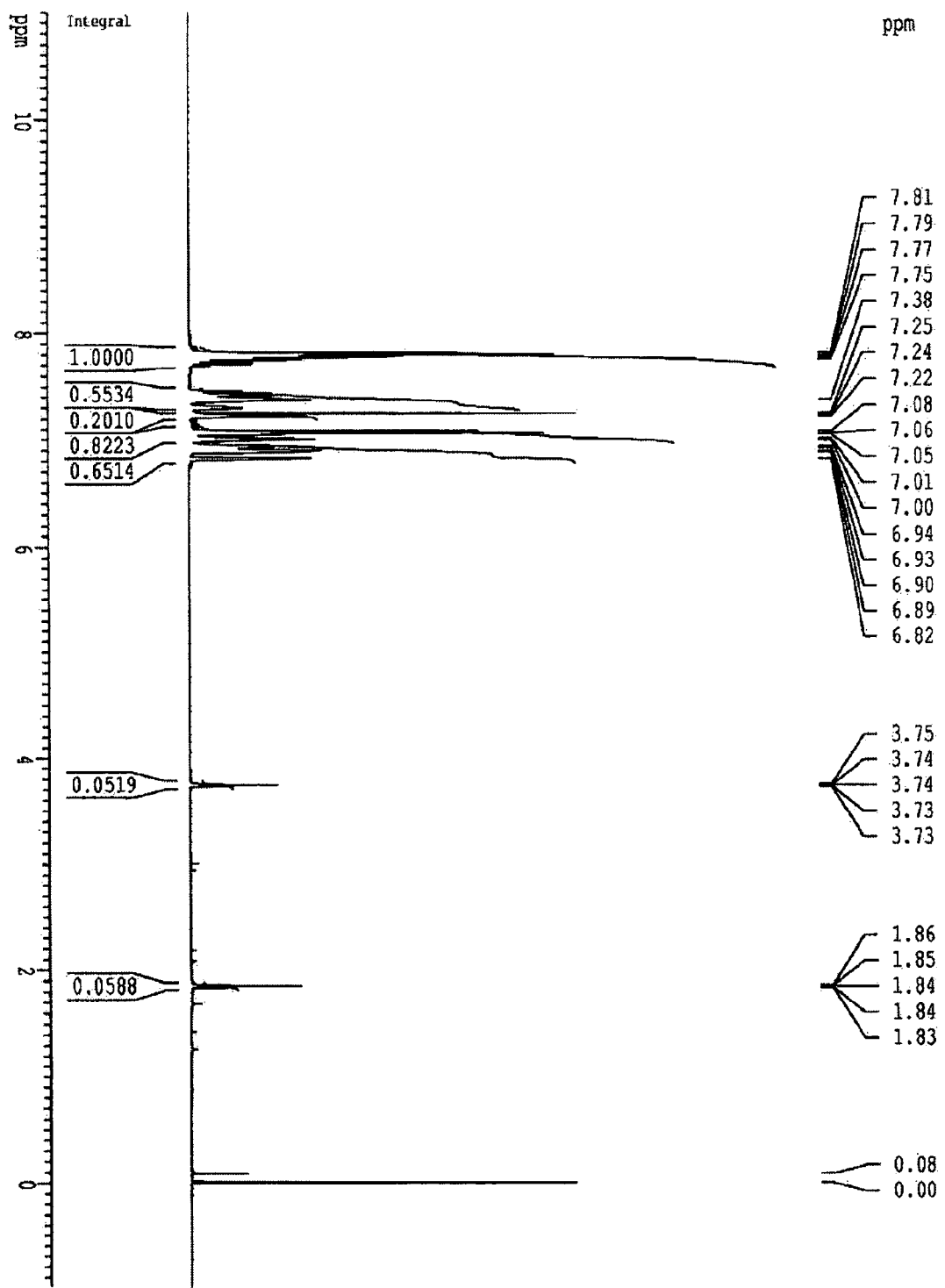
FIG. 1 shows the $^1$H-NMR spectra of the compound (1-1)

The aromatic compound, the polyarylene, the proton conductive membrane including thereof, and the polymer electrolyte membrane-electrode assembly for solid polymer electrolyte fuel cells including this proton conductive membrane according to the present invention are explained below in more detail.

Aromatic Compound

The aromatic compound according to the present invention (hereinafter sometimes referred to as "compound (1)") has both ends expressed by the general formula (1-1) described below, the constitutional unit (S) expressed by the general formula (1-2) described below, and the constitutional unit (T) expressed by the general formula (1-3) described below. The proton conductive membrane including this compound (1) has a hydrophobic constitutional unit (T) containing a fluorene structure as well as flexible constitutional unit (S), so that tenacity, other mechanical strength, workability, and the like of the polymer are improved.

X—
(1-1)

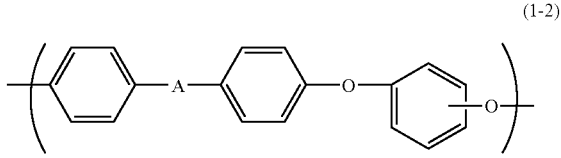
(1-2)

-continued (1-3)
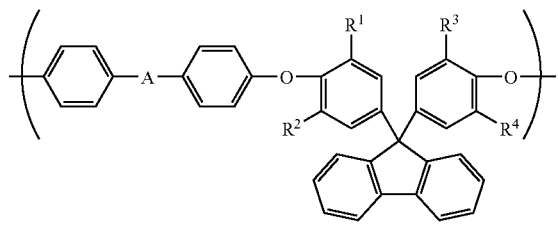

In the formulas (1-1) to (1-3), A represents independently a divalent linking group expressed by —CO— or —SO$_2$—, respectively. Among these, A is preferably —CO— from the viewpoint of the workability of the obtained polymer. X represents independently a halogen atom other than fluorine, i.e., a chlorine atom, bromine atom or iodine atom, respectively. Among these, X is preferably a chlorine atom. $R^1$ to $R^4$ represent independently a hydrogen atom, fluorine atom, alkyl group, or aryl group, respectively. Examples of the alkyl groups include methyl, ethyl, propyl, isopropyl, butyl, isobutyl, t-butyl, n-hexyl, n-octyl, and 2-ethylhexyl groups. Examples of the aryl groups include phenyl, naphthyl, and anthryl groups. Among these, $R^1$ to $R^4$ are preferably a hydrogen atom, methyl group, and phenyl group because the proton conductive membrane obtained from the compound (1) has superior water resistance, and mechanical properties such as strength and tenacity.

In the compound (1), the ratio s of the constitutional unit (S) is 50 to 95 mole %, preferably 60 to 90 mole %, and the ratio t of the constitutional unit (T) is 5 to 50 mole %, preferably 10 to 40 mole %, in which s+t=100 mole %. When t is less than 5, the proton conductive membrane obtained from the compound (1) tends to exhibit inferior water resistance. When t is more than 50, the proton conductive membrane obtained from the compound (1) tends to exhibit inferior mechanical properties and workability. In other words, when s and t are within range, the proton conductive membrane provided from the compound (1) has superior water resistance and mechanical properties such as tenacity and workability.

In addition, the molecular weight of the compound (1) was measured at 40 degrees Celsius by way of gel permeation chromatography (GPC) method by using tetrahydrofuran (THF) as a solvent. The number average molecular weight (Mn) of the compound (1) is 500 to 50000, preferably 1000 to 30000, and the weight average molecular weight (Mw) of the compound (1) is 1000 to 100000, preferably 2000 to 60000, based on polystyrene standard.

A specific example of the constitutional unit (S) is described below.

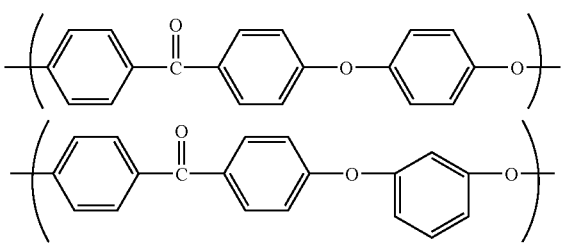

A specific example of the constitutional unit (T) is described below.

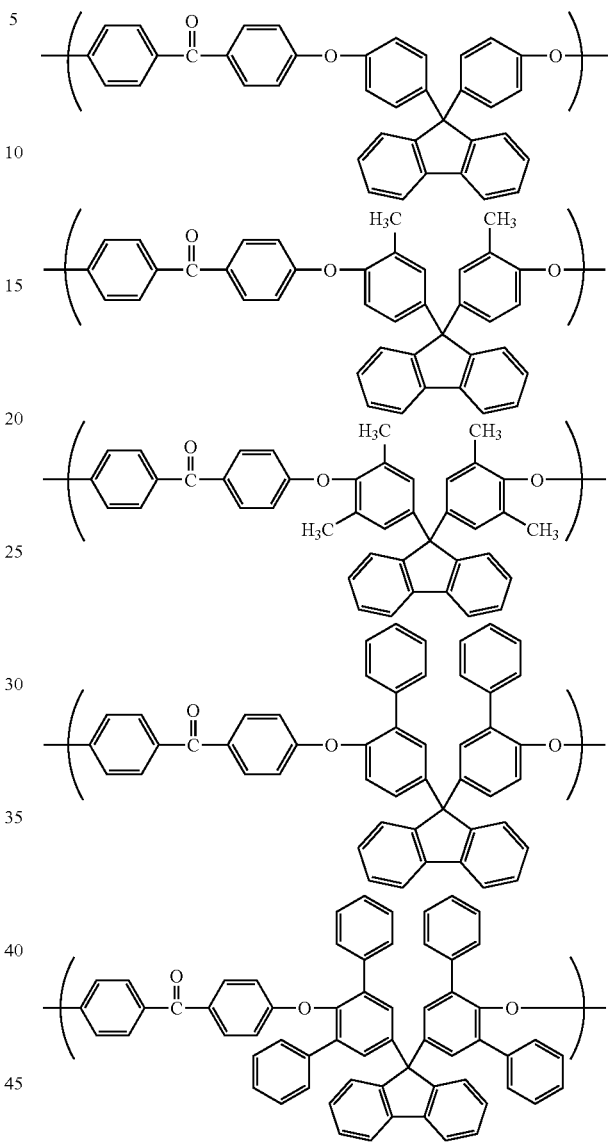

The compound (1) may be used alone or in combinations of two or more kinds. In addition, the compound (1) is synthesized by polymerizing bisphenols in which dihydroxybenzenes and fluorenes are linked (hereinafter sometimes referred to as "bisphenols"), with 4,4'-dihalobenzophenone and/or 4,4'-dihalodiphenylsulfone (hereinafter sometimes referred to as "dihalogenated compound").

Examples of dihydroxybenzenes include hydroquinone, resorcinol, and catechol. Among these, hydroquinone and resorcinol are preferred; resorcinol is preferred more because the proton conductive membrane provided from the compound (1) exhibits superior tenacity, other mechanical strength, and workability. The dihydroxybenzenes may be used alone or in combinations of two or more kinds.

Examples of the bisphenol compounds linked with a fluorenes include: 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)

fluorene, 9,9-bis(4-hydroxy-3-isopropylphenyl)fluorene, 9,9-bis(4-hydroxy-3-t-butylphenyl)fluorene, 9,9-bis(4-hydroxy-3-isobutylphenyl)fluorene, 9,9-bis(4-hydroxy-3-n-butylphenyl)fluorene, 9,9-bis(4-hydroxy-3-phenylphenyl)fluorene, 9,9-bis(4-hydroxy-3-fluorophenyl)fluorene, 9,9-bis(4-hydroxy-3,5-dimethylphenyl)fluorene, 9,9-bis(4-hydroxy-3,5-diethylphenyl)fluorene, 9,9-bis(4-hydroxy-3,5-di-n-propylphenyl)fluorene, 9,9-bis(4-hydroxy-3,5-diisopropylphenyl)fluorene, 9,9-bis(4-hydroxy-3,5-di-t-butylphenyl)fluorene, 9,9-bis(4-hydroxy-3,5-di-isobutylphenyl)fluorene, 9,9-bis(4-hydroxy-3,5-di-n-butylphenyl)fluorene, 9,9-bis(4-hydroxy-3,5-di-n-phenylphenyl)fluorene, and the like. The bisphenol may be used alone or in combinations of two or more kinds.

Examples of 4,4'-dihalobenzophenones substituted with a halogen atom such as fluorine and chlorine include 4,4'-dichlorobenzophenone, 4,4'-difluorobenzophenone, 4-chloro-4'-fluorobenzophenone, and the like. Examples of 4,4'-dihalodiphenylsulfones substituted with a halogen atom such as fluorine and chlorine include 4,4'-dichlorodiphenylsulfone, 4,4'-difluorodiphenylsulfone, and the like. Among these, 4,4'-dihalobenzophenones are preferably used. The dihalogenated compound may be used alone or in combinations of two or more kinds.

In synthesis of the compound (1), the bisphenols are alkali-metallized. At this point, the dihydroxybenzenes are used in 50 to 95 mole %, preferably 60 to 90 mole %, and the bisphenols linked with fluorenes are used in 5 to 50 mole %, preferably 10 to 40 mole %, based on the total amount of the dihydroxybenzenes and the bisphenols linked with fluorenes being 100 mole %. Alkali metals such as lithium, sodium and potassium, or hydrides, hydroxides or carbonates thereof and the like are added to the bisphenols in a polar solvent having a higher dielectric constant such as N-methyl-2-pyrrolidone, N,N-dimethylacetamide, sulfolane, diphenylsulfone and dimethylsulfoxide.

The alkali metals are added into the reaction in a somewhat excessive amount over the hydroxyl group of the bisphenols, usually 1.1 to 2.0 times, preferably 1.2 to 1.5 times of the equivalent amount of all hydroxyl groups contained in the bisphenols. An azeotropic solvent with water such as benzene, toluene, xylene, chlorobenzene and anisole is preferably also added to the reaction mixture to promote the reaction.

Then, the alkali metal salt of the bisphenols and the dihalogenated compounds are reacted. The amount of dihalogenated compounds (4,4'-dihalobenzophenones and/or 4,4'-dihalodiphenylsulfones described above) used for the reaction is 1.0001 to 3 times, preferably 1.001 to 2 times, of the amount of the bisphenols (the dihydroxybenzenes and the bisphenol linked with the fluorenes described above).

In addition, 4,4'-dichlorobenzophenone and 4-chloro-4'-fluorobenzophenone may be added to the reaction in an excessive amount again after the reaction ends to bring the compound (1) to have chlorine atoms at both ends. For example, the dihalogenated compounds are added in 0.01 to 3 times, preferably 0.05 to 2 times, to the amount of the bisphenols. In the case in which 4,4'-difluorobenzophenone and/or 4,4'-difluorodiphenylsulfone are used, the reaction is preferably devised, for example, by means of adding 4,4'-dichlorobenzophenone and/or 4-chloro-4'-fluorobenzophenone at the latter half of the reaction to bring the compound to be a dichloro-derivative.

These reactions are carried out at 60 to 300 degrees C., preferably 80 to 250 degrees C., for 15 minutes to 100 hours, preferably 1 to 24 hours.

The obtained compound (1) may be purified by way of a typical purification method: for example, manipulation of dissolution-precipitation. In addition, the molecular weight of the compound (1) can be adjusted to the reaction mole ratio of the dihalogenated compounds to the phenols.

The structure of the compound (1) can be confirmed by means of the analysis method described below. The constitutional unit (S) is specified by the existence of an $^1$H-NMR signal around 6.8 to 6.9 ppm. The constitutional unit (T) is specified by the existence of an $^1$H-NMR signal around 7.25 to 7.35 ppm. The ratio s of the constitutional unit (S) in the compound (1) and the ratio t of the constitutional unit (T) are determined by the intensity ratio of the signals by using $^1$H-NMR.

In addition, the existence of the halogen at the ends can be confirmed by determining halogen content, such as chlorine, bromine, and iodine, by X-ray fluorescence analysis. Polyarylene The polyarylene of the present invention includes the constitutional unit (S) expressed by the general formula (2-2) described below and the constitutional unit (T) expressed by the general formula (2-3) described below. In addition, the polyarylene may have a constitutional unit derived from another monomer. Therefore, the polyarylene may be obtained by polymerizing at least one kind of the compound (1), and polymerizing at least one kind of the compound (1) with another monomer.

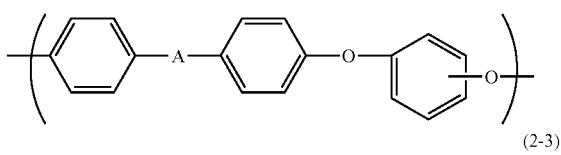

(2-2)

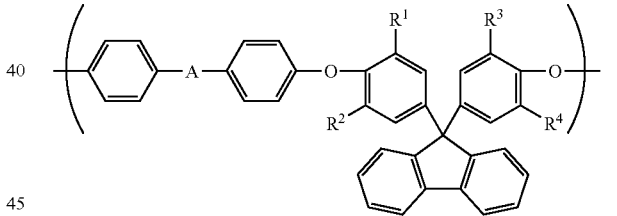

(2-3)

The meanings of A and $R^1$ to $R^4$ in the formulas (2-2) and (2-3) are the same as those of A and $R^1$ to $R^4$ in the formulas (1-1), (1-2), and (1-3). Among these, A is preferably —CO— from the viewpoint of workability of the obtained polymer, and $R^1$ to $R^4$ are preferably a hydrogen atom, methyl group, and phenyl group from the viewpoint in which the polyarylene obtained from the compound (1) has superior water resistance and mechanical properties such as strength and tenacity.

In the polyarylene, the ratio s of the constitutional unit (S) is 50 to 95 mole %, preferably 60 to 90 mole %, and the ratio t of the constitutional unit (T) is 5 to 50 mole %, preferably 10 to 40 mole %, where s+t=100 mole %. When t is less than 5, the polyarylene tends to exhibit inferior water resistance. When t is more than 50, the proton conductive membrane produced from the polyarylene tends to exhibit inferior mechanical properties and workability. In other words, when s and t are within range, the polyarylene has superior water resistance, and mechanical properties such as tenacity and workability.

Other constitutional units that the polyarylene of the present invention may preferably have are a constitutional unit having a sulfonic acid group as described in Japanese Unexamined Patent Application Publication Nos. 2004-137444, 2004-345997, 2004-346163, 2001-342241, and 2002-293889, the constitutional unit (U) expressed by the formula (3-3) described below being more preferred. The polyarylene including a constitutional unit like this is preferably used as the polymer electrolyte and the proton conductive membrane since a sulfonic acid group is introduced. The polyarylene including the constitutional unit (U) is particularly preferred because of superior proton conductivity and water resistance.

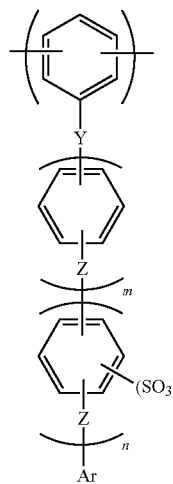

(3-3)

In the formula (3-3), Y represents at least one kind of divalent linking group selected from the group consisting of —CO—, —SO$_2$—, —SO—, —CONH—, —COO—, —(CF$_2$)$_p$— (p is an integer from 1 to 10) and —C(CF$_3$)$_2$—. Among these, Y is preferably —CO— and —SO$_2$—. Z represents a direct bond or at least one kind of divalent linking bond selected from the group consisting of —O—, —S—, —(CH$_2$)$_p$— (p is an integer from 1 to 10), and —C(CH$_3$)$_2$—. Among these, Z is preferably a direct bond and —O—. Ar represents an aromatic group having a sulfonate group (expressed by —SO$_3$H). Specific examples of the aromatic groups include phenyl, naphthyl, anthryl, and phenanthryl groups. Among these, phenyl and naphthyl groups are preferred. The aromatic group has at least one —SO$_3$H; preferably two or more —SO$_3$H when the aromatic group is a naphthyl group. The m represents an integer from 0 to 10, preferably 0 to 2; n represents an integer from 0 to 10, preferably 0 to 2; and k represents an integer from 1 to 4. From the viewpoint of characteristics of the obtained proton conductive membrane, the preferable combinations of integers m, n, and k, and structures represented by Y, Z, and Ar are as follows:

(i) m=0, n=0; Y is —CO—, Ar is a phenyl group with at least one —SO$_3$H;
(ii) m=1, n=0; Y is —CO—, Z is —O—, and Ar is a phenyl group with at least one —SO$_3$H;
(iii) m=1, n=1, k=1; Y is —CO—, Z is —O—, and Ar is a phenyl group with at least one —SO$_3$H; and
(vi) m=1, n=0; Y is —CO—, Z is —O—, and Ar is a naphthyl group with at least two —SO$_3$H.

The polyarylene having a sulfonic acid group includes the constitutional units (S) and (T) in 0.5 to 99.999 mole %, preferably 10 to 99.999 mole %, based on the overall total amount of constitutional units, with it being desirable to further include the constitutional unit having a sulfonic acid group in 0.001 to 99.5 mole %, preferably 0.001 to 90 mole %, based on the overall total amount of constitutional units.

The polyarylene having a sulfonic acid group is produced by using the method described below: for example see Japanese Unexamined Patent Application Publication No. 2004-137444. The compound (1) and a monomer having a sulfonic ester group are synthesized to produce the polyarylene having a sulfonic ester group (hereinafter sometimes referred to as "precursor polymer (A)"), and then the sulfonic ester group in the precursor polymer (A) is de-esterified to convert the sulfonic ester group into a sulfonic acid group. The polyarylene including the constitutional unit having a sulfonic acid group as well as the constitutional units (S) and (T) are thereby obtained.

Specifically, examples of the monomer having a sulfonic ester group include the sulfonic esters described in Japanese Unexamined Patent Application Publication No. 2004-137444 and Japanese Patent Application Publication Nos. 2003-143903 and 2003-143904.

Among these, the monomer expressed by the general formula (3-1) described below is preferably used.

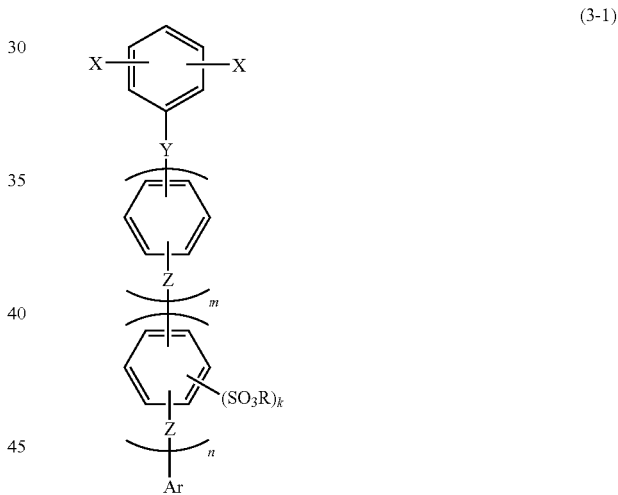

(3-1)

The meanings and preferable ranges of Y, Z, m, n, and k in the formula (3-1) are the same as those of Y, Z, m, n, and k in the formula (3-3). X represents a halogen atom other than fluorine, i.e., a chlorine atom, bromine atom or iodine atom. R represents a hydrocarbon group having 4 to 20 carbon atoms, specifically, a linear hydrocarbon group, branched hydrocarbon group, alicyclic hydrocarbon group, or hydrocarbon group with a five-membered heterocyclic ring, such as tert-butyl, iso-butyl, n-butyl, sec-butyl, neopentyl, cyclopentyl, hexyl, cyclohexyl, cyclopentylmethyl, cyclohexylmethyl, adamantyl, adamantylmethyl, 2-ethylhexyl, bicyclo[2.2.1]heptyl, bicyclo[2.2.1]heptylmethyl, tetrahydrofurfuryl, 2-methylbutyl, and 3,3-dimethyl-2,4-dioxolanemethyl groups. Among these, a neopentyl, tetrahydrofurfuryl, cyclopentylmethyl, cyclohexylmethyl, adamantylmethyl, and bicyclo[2.2.1]heptylmethyl groups are preferred, a neopentyl group being more preferred. Ar' represents an aromatic group having a sulfonic ester group, which means a substituent expressed by —SO$_3$R in which the meaning and preferable range of R is the same as those mentioned above. Specific examples of the aromatic groups include phenyl, naphthyl, anthryl, and phenanthryl groups. Among these, phenyl and naphthyl groups are preferred. The aromatic group has at least one —$SO_3R$, preferably two or more —$SO_3R$ when the aromatic group is a naphthyl group.

When the precursor polymer (A) is produced, the compound (1) is desirable to use in 0.5 to 99.999 mole %, preferably 10 to 99.999 mole %, and the monomer having a sulfonic ester group is desirable to use in 0.001 to 99.5 mole %, preferably 0.001 to 90 mole %.

To obtain the precursor polymer (A), polymerization is achieved by use of a catalyst. The available catalyst contains a transition metal compound. The catalyst essentially contains (i) a transition metal salt and a ligand compound (hereinafter sometimes referred to as "ligand component"), or a transition metal complex with a coordinate ligand (including copper salt), and (ii) a reducing agent and additionally an optional "salt", in order to increase the polymerization reaction rate. Specific examples of the catalyst components and the usage ratio of each component are described in Japanese Unexamined Patent Application Publication No. 2001-342241. Solvents, concentration, temperature, time period and the like in the reaction are also described in Japanese Unexamined Patent Application Publication No. 2001-342241. The precursor polymer (A) is de-esterified in accordance with the method described in Japanese Unexamined Patent Application Publication No. 2004-137444 to obtain the polyarylene having a sulfonic acid group.

The ion-exchange capacity of the polyarylene having a sulfonic acid group prepared in accordance with the methods described above is usually 0.3 to 5 meq/g: preferably 0.5 to 3 meq/g, and even more preferably 0.8 to 2.8 meq/g. However, when the ion-exchange capacity is less than 0.3 meq/g, the power generation performance tends to be insufficient due to lower proton conductivity, and when the ion-exchange capacity is more than 5 meq/g, the water resistance tends to be considerably degraded.

For example, the ion-exchange capacity of the polyarylene can be adjusted to change kinds, usage ratios, and combinations of monomers, specifically the compound (1) and other monomers expressed by the formulas (3-1) and (3-2). In addition, the method for measuring the ion-exchange capacity is described below.

The molecular weight of the polyarylene having a sulfonic acid group was determined based on polystyrene standard by means of gel permeation chromatography (GPC) using N-methyl-2-pyrrolidone (NMP) in which lithium bromide and phosphoric acid are added as an eluting solvent. The number average molecular weight (Mn) of the polyarylene is 5000 to 500000, preferably 10000 to 400000, and the weight average molecular weight (Mw) of the polyarylene is 10000 to 1000000, preferably 20000 to 800000, based on polystyrene standard.

Solid Polymer Electrolyte

The solid polymer electrolyte of the present invention includes the aromatic compound and the polyarylene, and may further include an antioxidant, such as a phenolic hydroxide group containing compound, amine compound, organic phosphorous compound, and organic sulfur compound, unless the proton conductivity of the solid polymer electrolyte does not deteriorate.

The solid polymer electrolyte is used in various forms such as granulation, fiber and membrane types, depending on the intended use. For example, when the solid polymer electrolyte is used for an electrochemical device such as a fuel cell or a water electrolysis device, the form is preferably a film type (proton conductive membrane).

Proton Conductivity Membrane

The proton conductive membrane of the present invention is prepared by using the solid polymer electrolyte including the aromatic compound and the polyarylene. In addition, when the proton conductive membrane is prepared, an inorganic acid such as sulfuric acid or phosphoric acid, an organic acid including carboxylic acid, and an appropriate amount of water may be used in accordance with the solid polymer electrolyte.

The polymer electrolyte membrane is produced by a casting process in which the polyarylene having a sulfonic acid group is dissolved in a solvent, and then the mixture is poured over a substrate to form a film.

The substrate may be selected without particular limitations from those utilized in conventional solution casting processes: for example, the substrate is of plastics or metals, preferably of thermoplastic resins such as polyethylene terephthalate (PET) film.

Examples of the solvents to dissolve the polyarylene having a sulfonic acid group include aprotic polar solvents such as N-methyl-2-pyrrolidone, N,N-dimethylformamide, γ-butyrolactone, N,N-dimethylacetamide, dimethylsulfoxide, dimethylurea and dimethylimidazolizinone. Among these, N-methyl-2-pyrrolidone (hereinafter sometimes referred to as "NMP") is preferable from the viewpoint of solubility and viscosity. The aprotic polar solvent may be used alone or in a combination of two or more kinds.

In addition, the solvent to dissolve the polyarylene polymer having a sulfonic acid group can be a mixture of the aprotic polar solvent and an alcohol. Examples of the alcohols include methanol, ethanol, propyl alcohol, iso-propyl alcohol, sec-butyl alcohol and tert-butyl alcohol. Methanol is particularly preferred since it can reduce the viscosity over a wider range of compositions. The alcohol may be used alone or in a combination of two or more kinds.

When a solvent mixture containing an aprotic polar solvent and alcohol is used as the solvent, the mixture in which the content of the aprotic polar solvent is 25 to 95 mass %, preferably 25 to 90 mass %, and the content of the alcohol is 5 to 75 mass %, preferably 10 to 75 mass %, with a provision that the total content is 100 mass %, is preferred. The alcohol within the range may have a great effect on decreasing the solution viscosity.

The concentration of the polyarylene in the solution to dissolve the polyarylene having a sulfonic acid group, depending on the molecular weight of the polyarylene, is typically 5 to 40 mass %, preferably 7 to 25 mass %. When the polymer concentration is less than 5 mass %, a thicker membrane is difficult to obtain and pinholes tend to occur. When the polymer concentration is more than 40 mass %, the solution viscosity becomes too high and a film is hardly formed; the surface smoothness also tends to deteriorate.

The solution viscosity depends on the molecular weight and concentration of the polyarylene polymer having a sulfonic acid group and the concentration of the polyarylene; however, it is typically 2,000 to 100,000 mPa·s, and preferably 3,000 to 50,000 mPa·s. When the solution viscosity is less than 2,000 mPa·s, the retaining property of the solution is likely to be insufficient, and thus, the solution sometimes flows out of the substrate. When the solution viscosity is more than 100,000 mPa·s, the viscosity is too high to extrude the solution from a die, and thus, the film may be difficult to produce by means of flowing processes.

After the film is produced as described above, the non-dried film is immersed in water. Thereby, the organic solvent in the non-dried film can be replaced with water, and the residual solvent can be reduced within the proton conductive membrane. The non-dried film may be pre-dried before immersion into water. The pre-drying is typically carried out at 50 to 150 degrees C. for 0.1 to 10 hours.

The non-dried film may be immersed into water in a batch method or a continuous method, where an intact laminate film formed on a substrate film (e.g. PET) or a membrane separated from the substrate is immersed into water and wound up successively. In the batch method, it is preferred that the film after processing be fitted into a frame so as to prevent wrinkles on the surface of the processed film.

The contact ratio of water utilized for immersing the non-dried films is 10 parts by mass or more, preferably 30 parts by mass or more based on one mass part of the non-dried films. To reduce the amount of a residual solvent within the obtained proton conductive membrane to as little as possible, it is desired that the contact ratio be maintained as much as possible. In addition, the concentration of the organic solvent is maintained to at most a certain level by exchanging or overflowing water used for immersion, effectively reducing the amount of the residual solvent within the resulting proton conductive membrane. The concentration of organic solvent in the water is effectively homogenized by stirring, for example, so that the two-dimensional distribution of residual organic solvent in the proton conductive membrane can be reduced.

The temperature of the water, in which the non-dried film is immersed, is preferably 5 to 80 degrees Celsius. The higher the temperature is, the higher the replacement rate of the organic solvent with water and the absorption of the film. However, the surface of the proton conductive membrane may be rough after drying. The temperature of the water is preferably 10 to 60 degrees Celsius from the viewpoint of replacement rate and ease of handling. The immersion period depends on the initial content of the residual solvent, contact ratio, and processing temperature. However, the immersion period is typically 10 minutes to 240 hours, preferably 30 minutes to 100 hours.

When non-dried films are dried after being immersed in water, the proton conductive membrane may be obtained with a lower solvent content. The content of the residual solvent in the proton conductive membrane obtained in such a process is usually 5 mass % or less. Depending on an immersion condition, the content of the residual solvent in the obtained proton conductive membrane can be decreased to 1 mass % or less. For example, such a condition includes when the contact ratio of the non-dried film to water is 50 parts by mass or more to 1 part by mass, the water temperature is 10 to 60 degrees Celsius at the time of immersion, and the immersion period is 10 minutes to 10 hours.

After immersing the non-dried films into water as described above, the film is dried at 30 to 100 degrees Celsius for 10 to 180 minutes, preferably at 50 to 80 degrees Celsius for 15 to 60 minutes. Then the film is dried at 50 to 150 degrees Celsius, preferably under reduced pressure of 0.1 to 500 mmHg for 0.5 to 24 hours to obtain the proton conductive membrane.

The thickness of the resulting proton conductive membrane is typically 10 to 100 µm, preferably 20 to 80 µm in the dried condition.

The proton conductive membrane of the present invention may contain an antioxidant, preferably a hindered phenol compound having a molecular weight of 500 or more so that the antioxidant may enhance the durability as the proton conductive membrane.

Hindered phenol system compounds that may be used in the present invention include: triethyleneglycol bis[3-(3-t-butyl-5-methyl-4-hydroxyphenyl)propionate (product name: IRGANOX 245), 1,6-hexanediol-bis [3-(3,5-di-t-butyl-4-hydroxyphenyl)propionate] (product name: IRGANOX 259), 2,4-bis-(n-octylthio)-6-(4-hydroxy-3,5-di-t-butylanilino)-3,5-triazine (product name: IRGANOX 565), pentaerylthrityl-tetrakis[3-(3,5-di-t-butyl-4-hydroxyphenyl)propionate] (product name: IRGANOX 1010), 2,2-thio-diethylenebis[3-(3,5-di-t-butyl-4-hydroxyphenyl)propionate] (product name: IRGANOX 1035), octadecyl-3-(3,5-di-t-butyl-4-hydroxyphenyl)propionate)(product name: IRGANOX 1076), N,N-hexamethylene bis(3,5-di-t-butyl-4-hydroxy-hydrocinnamamide)(product name: IRGANOX 1098), 1,3,5-trimethyl-2,4,6-tris(3,5-di-t-butyl-4-hydroxybenzyl)benzene (product name: IRGANOX 1330), tris-(3,5-di-t-butyl-4-hydroxybenzyl)-isocyanurate (product name: IRGANOX 3114), and 3,9-bis[2-[3-(3-t-butyl-4-hydroxy-5-methylphenyl)propionyloxy]-1,1-dimethylethyl]-2,4,8,10-tetraoxaspiro[5.5]undecane (product name: Sumilizer GA-80).

In the present invention, the hindered phenol compounds are preferably used in an amount of 0.01 to 10 parts by mass to 100 parts by mass of the polyarylene having a sulfone group.

The proton conductive membrane of the present invention is preferably used as the proton conductive membrane in an electrolyte for a primary cell and a secondary cell, a polymer solid electrolyte for a fuel cell, a display device, a variety of sensors, a signal transfer medium, a solid condenser, an ion exchange membrane, and the like.

Electrode

The electrode of the present invention consists of catalyst metal particles or an electrode catalyst on which catalyst metal particles are supported, and an electrode-electrolyte, and may include other component such as carbon fiber, a dispersant, and a water repellent if necessary.

The catalyst metal particles are not particularly limited so long as they have catalytic activity. However, a metal black consisting of fine precious metal particles by themselves, such as platinum black, can be used. The electrode catalyst on which catalyst metal particles are supported is not particularly limited so long as it has conductivity and appropriate anticorrosion. However, the electrode catalyst on which catalyst metal particles are supported, in which carbon is a main component, is preferably used since carbon has sufficient specific surface area to highly disperse the catalyst metal particles and sufficient electronic conductivity. The catalyst carrier composing the electrode not only supports the catalyst metal particles, but also fulfills a function as an electric collector for collecting electrons for or from an external circuit. The higher the electric resistance the catalyst carrier has, the higher the internal resistance of a cell becomes, which results in lowering the performance of the cell. Therefore, the electronic conductivity of the catalyst carrier contained in the electrode must be sufficiently high. In other words, an electrode catalyst carrier having sufficient electronic conductivity can be used, porous carbon material being preferably used. Carbon blacks or activated carbons may preferably be used as the porous carbon material. Examples of the carbon blacks include channel blacks, furnace blacks, thermal blacks, and acetylene blacks; the activated carbons may be those produced through carbonizing and activating various carbon-containing materials. In addition, a metal oxide, metal carbide, metal nitride, and polymer compound having electronic conductivity can be contained. In addition, "main component" referred to herein means being 60% or more carbonaceous.

In addition, a platinum or platinum alloy is used in the catalyst metal particles supported on the conductive carrier; however, a platinum alloy may offer stability and activity as the electrode catalyst. Preferably, a platinum alloy is formed from the group consisting of platinum and at least one metal selected from the platinum group of metals other than platinum (i.e., ruthenium, rhodium, palladium, osmium and iridium), or metals of other groups such as cobalt, iron, titanium, gold, silver, chrome, manganese, molybdenum, tungsten, aluminum, silicon, rhenium, zinc and tin. The platinum alloy may include an intermetallic compound that is formed of platinum and another metal alloyable with platinum.

The supporting rate of the platinum or platinum alloy (i.e., mass % of platinum or platinum alloy to overall mass of the supported catalyst) is 20 to 80 mass %, preferably 30 to 55 mass %, and thus, a high output power is obtained within this range. However, when the supporting rate is less than 20 mass %, sufficient output power may not be obtained, and when the supporting rate is over 80 mass %, the particles of a platinum or platinum alloy may not be supported with high dispersivity on the carbon material.

The primary particle size of the platinum or platinum alloy is preferably 1 to 20 nm so as to yield a highly active gas-diffusion electrode. In particular, the primary particle size is preferably 2 to 5 nm in order to ensure that the platinum or platinum alloy has a larger surface area from the viewpoint of reaction activity.

As the electrode-electrolyte, an ion conductive polymer electrolyte (ion conductive binder) having a sulfonic acid group is preferably used. Usually, the supported catalyst is covered with the electrolyte, and thus, protons (H+) travel through the pathway connecting to the electrolyte.

A perfluorocarbon polymer, exemplified by Nafion (registered mark), Flemion (registered mark) and Aciplex (registered mark), is appropriately used for an ion conductive polymer electrolyte containing a sulfonic acid group. A sulfonated derivative of a vinyl monomer such as polystyrene sulfonate, a polymer in which a sulfonic acid group or phosphoric group is introduced in heat-resistant polymers such as polybenzoimidazole and polyetheretherketone, or ion conductive polymer electrolytes based on the aromatic hydrocarbon compounds, such as sulfonated polyarylene described herein, may be utilized in place of the perfluorocarbon polymers.

The ion conductive binder is included in a mass ratio of 0.1 to 3.0, preferably 0.3 to 2.0, to the mass of the catalyst particles. When the ratio of the ion conductive binder is less than 0.1, protons may not be conducted into the electrolyte, and thus, possibly resulting in insufficient power output. When the ratio is more than 3.0, the ion conductive binder may cover the catalyst particles completely, and thus, gas cannot reach the platinum, possibly resulting in insufficient power output.

As for carbon fiber that can be added if necessary, rayon carbon fiber, PAN carbon fiber, lignin poval carbon fiber, pitch carbon fiber, and vapor-grown carbon fiber can be used; among these, vapor-grown carbon fiber is preferred. When carbon fiber is included, pore volume in the electrode catalyst layer is increased so that diffusibility of fuel gas or oxygen gas is improved, and flooding of generated water and the like are improved to enhance power generation performance. In addition, carbon fiber may be contained by an electrode catalyst layer on the anode side or the cathode side, or both.

The dispersant can include an anionic, cationic, ampholytic, and nonionic surfactant. The dispersant may be used alone or in combination. Among these, a surfactant having a basic group is preferred, an anionic or cationic surfactant is more preferable, and a surfactant having a molecular weight of 5000 to 30000 is the most preferable. By adding the dispersant in the paste composition for the electrode used when the electrode catalyst layer is formed, preservation stability and flowability of the paste composition becomes superior, which improves productivity in coating.

The membrane electrode assembly according to the present invention may be formed solely of an anodic catalyst layer, a cathodic catalyst layer, and a proton conductive membrane in which a gas diffusion layer formed of a conductive porous material such as carbon paper and carbon cloth is more preferably disposed outside the catalyst layer along with the anode and cathode. The gas diffusion layer may act as a collector of electricity, and therefore, the combination of the gas diffusion layer and the catalyst layer is referred to as an "electrode" herein when the gas diffusion layer is provided.

In a solid polymer electrolyte fuel cell equipped with the membrane-electrode assembly according to the present invention, oxygen-containing gas is supplied to the cathode and hydrogen-containing gas is supplied to the anode. Specifically, a separator having channels for the gas passage is disposed outside both electrodes of the membrane-electrode assembly, gas flows into the passage, and the gas for fuel is thereby supplied to the membrane-electrode assembly.

The method for producing the membrane electrode assembly may be selected from various methods: a catalyst layer directly formed on an ion-exchange membrane and sandwiched with gas diffusion layers as required; a catalyst layer formed on a substrate for a gas diffusion layer such as carbon paper, and the catalyst layer connected with an ion-exchange membrane; and a catalyst layer formed on a flat plate, the catalyst layer transferred onto an ion-exchange membrane, and then the flat plate peeled away, and sandwiched with gas diffusion layers as required.

The method for forming the catalyst layer may be selected from a conventional method. The supported catalyst and a perfluorocarbon polymer having a sulfonic acid group are dispersed into a medium to prepare a dispersion; optionally, a water repellent agent, pore-forming agent, thickener, diluent solvent and the like are added to the dispersion, and then the dispersion is formed on the ion-exchange membrane, the gas-diffusion layer or the flat plate.

Examples of methods for forming the electrode paste composition include brush coating, writing brush coating, bar coater coating, knife coater coating, doctor blade method, screen printing, and spray coating.

In cases in which the catalyst layer is not formed on the ion-exchange layer directly, the catalyst layer and the ion-exchange layer are preferably connected by means of a hot press adhesion process (See Japanese Unexamined Patent Application Publication No. 07-220741), etc.

EXAMPLES

The present invention will be explained more specifically with reference to the Examples, which are not intended to limit the scope of the present invention.

Analysis Method

The compound (1) and the polyarylene having the sulfonic acid group are analyzed by way of the following method.

Molecular Weight

The molecular weight of the compound (1) was measured at 40 degrees Celsius by way of gel permeation chromatography (GPC) method using tetrahydrofuran (THF) as a solvent, based on polystyrene standard. The molecular weight of the polyarylene having a sulfonic acid group was determined as the molecular weight based on polystyrene standard by means of gel permeation chromatography (GPC) using N-methyl-2-pyrrolidone (NMP), in which lithium bromide and phosphoric acid were added as an eluting solvent, based on polystyrene standard.

Ion Exchange Capacity

The resulting sulfonated polymer having a sulfonic acid group was washed until the pH of the washed water was 4 to 6, so as to sufficiently remove free residual acid, and was then dried. The polyarylene was then weighed in a predetermined amount, and dissolved in a mixed solvent of THF/water, then the solution was titrated with a NaOH standard solution, using phenolphthalein as an indicator, and the ion exchange capacity was determined from the neutralization point.

Structure Analysis

The structure of the compound (1) and the polyarylene having the sulfonic acid group were confirmed by $^1$H-NMR method. Specifically, it was confirmed that the structure had the constitutional unit (S) by the existence of a signal around 6.8 to 6.9 ppm, the structure had the constitutional unit (T) by existence of a signal around 7.25 to 7.35 ppm, and then the ratio s of the unit (S) and the ratio t of the constitutional unit (T) were determined from each of the intensity ratios.

In addition, the existence and amount of the constitutional unit (U) was determined by measuring the ion exchange capacity of the polyarylene.

Example 1-1

Synthesis of the Compound (1-1)

92.76 g (265 mmol) of 9,9-bis(4-hydroxyphenyl)fluorene (BPFL), 87.44 g (794 mmol) of resorcinol (Res), 205.36 g (941 mmol) of 4,4'-difluorobenzophenone (DFBP), 52.45 g (224 mmol) of 4-chloro-4'-fluorobenzophenone (CFBP), and 175.61 g (1271 mmol) of potassium carbonate were added to a 3 L separable four-necked flask equipped with a stirrer, a thermometer, a cooling pipe, a Dean-Stark apparatus, and a nitrogen inlet tube. 1250 mL of N,N-dimethyl acetamide (DMAc) and 500 mL of toluene were added. The mixture was heated to 155 degrees Celsius with the water generated through the reaction being co-distilled with toluene and removed through the Dean-Stark apparatus. When water generation fell to nearly zero after three hours, the reaction solution was heated to 165 degrees Celsius with toluene being removed from the Dean-Stark apparatus, and then the reaction solution was stirred at 160 to 165 degrees Celsius for 5 hours. 30.37 g (129 mmol) of CFBP was added, and then the mixture was stirred at 160 to 165 degrees Celsius for another 3 hours.

The reaction solution was gradually poured into 5.0 L of methanol to solidify the reactant, and stirred for 1 hour. The precipitate obtained through filtering congealed liquid was washed with a small amount of methanol. The addition of 5.0 L of methanol to the obtained precipitate, followed by stirring of the mixture and washing was repeated 3 times. Afterwards, the resulting product was dried to obtain 347 g of the intended product, which is the compound (1-1), in a yield of 88%.

The compound (1-1) had a number molecular weight of 4100 and a weight molecular weight of 6600 measured by GPC (polystyrene standard). In addition, this compound (1-1) includes the constitutional units (S-1) and (T-1) expressed by the formulas described below, in which the ratio s1 of the constitutional unit (S-1) was 75 mole %, and the ratio t1 of the constitutional unit (T-1) was 25 mole %. Both ends of the compound (1-1) were chlorine atoms.

Example 1-2

Synthesis of Polyarylene Having Sulfonic Acid Group (1)

18.2 g (45.3 mmol) of 3-(2,5-dichlorobenzoyl)benzenesulfonic acid neopentyl, 22.5 g (5.5 mmol) of the compound (1-1) obtained in Example 1-1, 1.00 g (1.5 mmol) of bis(triphenylphosphine)nickel dichloride, 0.23 g (1.52 mmol) of sodium iodide, 5.33 g (20.3 mmol) of triphenylphosphine and 7.97 g (122 mmol) of zinc were added to a 0.5 L flask equipped with a stirrer, a thermometer, and a nitrogen inlet, followed by purging with dry nitrogen gas. To the mixture, 100 mL of DMAc was added, and the reaction mixture was maintained at 80 degrees C. while being stirred continuously for 3 hours, followed by the reaction mixture being diluted with 100 mL of DMAc, and insoluble matter being filtered.

The resulting precursor polymer (A) was poured into a 1 L flask equipped with a stirrer, thermometer and nitrogen inlet tube, and was heated to 115 degrees C. with stirring, followed by the addition of 11.8 g (136.0 mmol) of lithium bromide. The mixture was stirred for 7 hours, and the solution was poured into 1 L of water to precipitate the product. The product was then washed with acetone, a 10% sulfuric acid water solution, and pure water, consecutively, and was then dried to obtain 27 g of the intended polyarylene (1) having a sulfonic acid group. The weight average molecular weight (Mw) of the resulting polymer was 111,000. FIG. 1 shows the $^1$H-NMR spectra of this polymer. The obtained polymer was presumed to include the constitutional units (S-1) to (U-1) expressed by the formulas described below, in which the ratio s1 of the constitutional unit (S-1) was 75 mole %, and the ratio t1 of the constitutional unit (T-1) was 25 mole %, based on the combined amount of the constitutional units (S-1) and (T-1). In addition, in the obtained polymer it was presumed that the combined ratio of the constitutional units (S-1) and (T-1) were 11 mole %, and the ratio of the constitutional unit (U-1) was 89 mole %, based on the overall total amount of constitutional units. The ion exchange capacity was 1.3 meq/g.

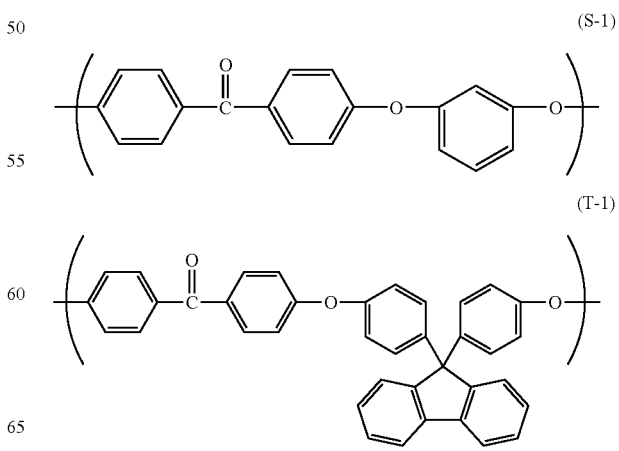

-continued

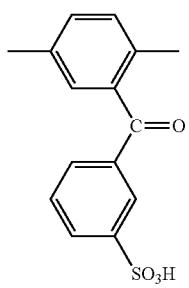

(U-1)

Example 1-3

Preparation of Proton Conductive Membrane (1) and Membrane-Electrode Assembly

The resulting polyarylene (1) having a sulfonic acid group dissolved in a 15 mass % N-methylpyrrolidone (NMP) solution was casted onto a glass plate to prepare the proton conductive membrane (1) having a thickness of 40 µm.

Platinum particles were supported on a carbon black (furnace black) having an average particle size of 50 nm at a weight ratio 1:1 of carbon black:platinum to prepare catalyst particles. The catalyst particles were dispersed uniformly into a perfluoroalkylene sulfonic acid polymer compound (Nafion (registered mark), by DuPont) solution as an ion conductive binder in a mass ratio 8:5 of ion conductive binder:catalyst particles, so as to prepare a catalyst paste.

The catalyst paste with a platinum content of 0.5 mg/cm$^2$ was coated on a PET film by the use of a bar coater to prepare an electrode sheet.

The proton conductive membrane (1) was cut in a 10 cm×10 cm square, the electrode sheets were fixed on both sides of the proton conductive membrane, and then was subjected to hot pressing to obtain a catalyst converted membrane (CCM). The hot pressing was conducted at 160 degrees Celsius and 4 MPa for 15 minutes.

The carbon black and polytetrafluoroethylene (PTFE) particles were mixed in a weight ratio of 4:6 of carbon black: PTFE particles, and the resulting mixture was dispersed uniformly into ethylene glycol to prepare a slurry. Then, the slurry was coated, and dried on one side of the carbon paper to form an underlying layer. Two gas diffusion layers, which were formed of the underlying layer and the carbon paper, were prepared.

The CCM was gripped at the side of the underlying layer of the gas diffusion layer, and then was subjected to hot pressing to obtain a membrane-electrode assembly. The hot pressing was conducted at 140 degrees Celsius and 3 MPa for 5 minutes. In addition, a solid polymer electrolyte fuel cell may be constructed from the membrane electrode assembly obtained in Example 1-3 in such a way that a separator, being also usable as a gas passage, is laminated on the gas diffusion layer.

Example 2-1

Synthesis of the Compound (1-2)

The reaction was performed in the same manner as Example 1-1 until CFBP was secondly added, except that 36.71 g (105 mmol) of BPFL, 103.82 g (943 mmol) of Res, 07.81 g (952 mmol) of DFBP, 42.46 g (181 mmol) of CFBP, and 173.75 g (1257 mmol) of potassium carbonate were added to a 3 L separable four-necked flask, and then 360 mL of DMAc and 145 mL of toluene were added. 24.58 g (105 mmol) of CFBP was added, followed by stirring at 160 to 165 degrees Celsius for another 3 hours. Afterwards, the resulting product was treated in the same manner as Example 1-1 to obtain 300 g of the intended product, which is the compound (1-2), in a yield of 86%.

The compound (1-2) had a number molecular weight of 4600 and a weight molecular weight of 6900. In addition, this compound (1-2) includes the constitutional units (S-2) and (T-2) expressed by the formula described below, in which the ratio s2 of the constitutional unit (S-2) was 90 mole %, and the ratio t2 of the constitutional unit (T-2) was 10 mole %. Both ends of the compound (1-2) were chlorine atoms.

Example 2-2

Synthesis of Polyarylene Having Sulfonic Acid Group (2)

Figure 2:
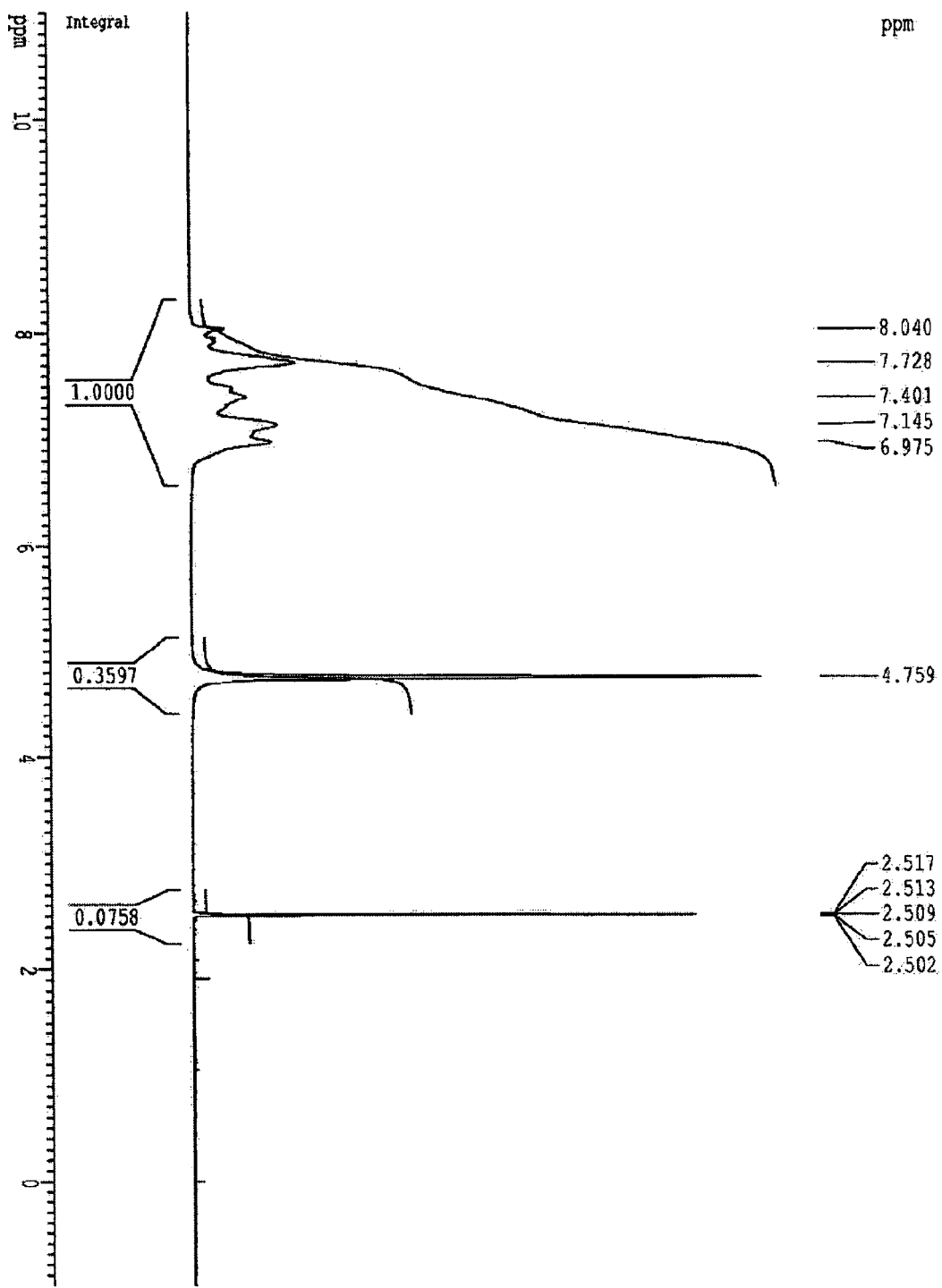
FIG. 2 shows the $^1$H-NMR spectra of the polyarylene (1)

26 g of the polyarylene having a sulfonic acid group (2) was obtained in the same manner as Example 1-2, except that 25.3 g (5.51 mmol) of the compound (1-2) obtained in Example 2-1 was used. The weight average molecular weight (Mw) of the resulting polymer was 115,000. FIG. 2 shows the $^1$H-NMR spectra of this polymer. The obtained polymer was presumed to include the constitutional units (S-2) to (U-2) expressed by the formulas described below, in which the ratio s2 of the constitutional unit (S-2) was 90 mole %, and the ratio t2 of the constitutional unit (T-2) was 10 mole %, based on the combined amount of the constitutional units (S-2) and (T-2). In addition, in the obtained polymer it was presumed that the combined ratio of the constitutional units (S-2) and (T-2) were 11 mole %, and the ratio of the constitutional unit (U-2) was 89 mole %, based on the overall total amount of constitutional units. The ion exchange capacity was 1.2 meq/g.

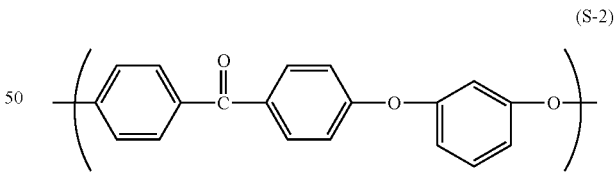

(S-2)

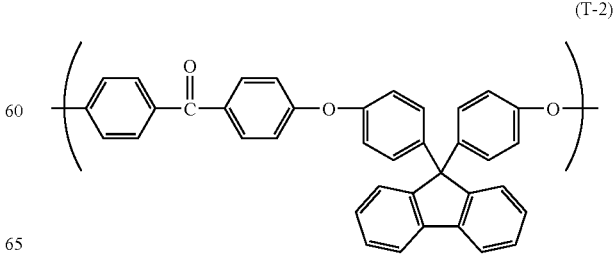

(T-2)

-continued

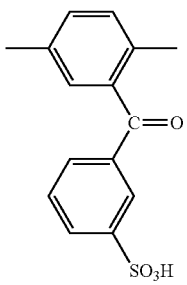
(U-2)

Example 2-3

Preparation of Proton Conductive Membrane (2) and Membrane-Electrode Assembly

The resulting polyarylene having a sulfonic acid group dissolved in 15 mass % of N-methylpyrrolidone (NMP) solution was casted onto a glass plate to prepare the proton conductive membrane (2) having a thickness of 40 μm. A membrane electrode assembly was prepared in the same manner as Example 1-3, except that the proton conductive membrane (2) obtained in Example 2-3 was used.

Example 3-1

Synthesis of the compound (3-1)

The reaction was performed in the same manner as Example 1-1 until CFBP was secondly added, except that 37.40 g (107 mmol) of BPFL, 21.83 g (198 mmol) of Res, 59.15 g (271 mmol) of DFBP, 15.11 g (64.4 mmol) of CFBP, and 50.57 g (366 mmol) of potassium carbonate were added into a 3 L separable four-necked flask, and 360 mL of DMAc and 145 mL of toluene were added. 8.75 g (37.3 mmol) of CFBP was added, followed by stirring at 160 to 165 degrees Celsius for another 3 hours. Afterwards, the resulting product was treated in the same manner as Example 1-1 to obtain 100 g of the intended product, which is the compound (1-3), in a yield of 80%.

The compound (1-3) had a number molecular weight of 4300 and a weight molecular weight of 6800. In addition, this compound (1-3) includes the constitutional units (S-3) and (T-3) expressed by the formula described below, in which the ratio s3 of the constitutional unit (S-3) was 65 mole %, and the ratio t3 of the constitutional unit (T-3) was 35 mole %. Both ends of the compound (1-3) were chlorine atoms.

Example 3-2

Synthesis of Polyarylene Having Sulfonic Acid Group (3)

Figure 3:
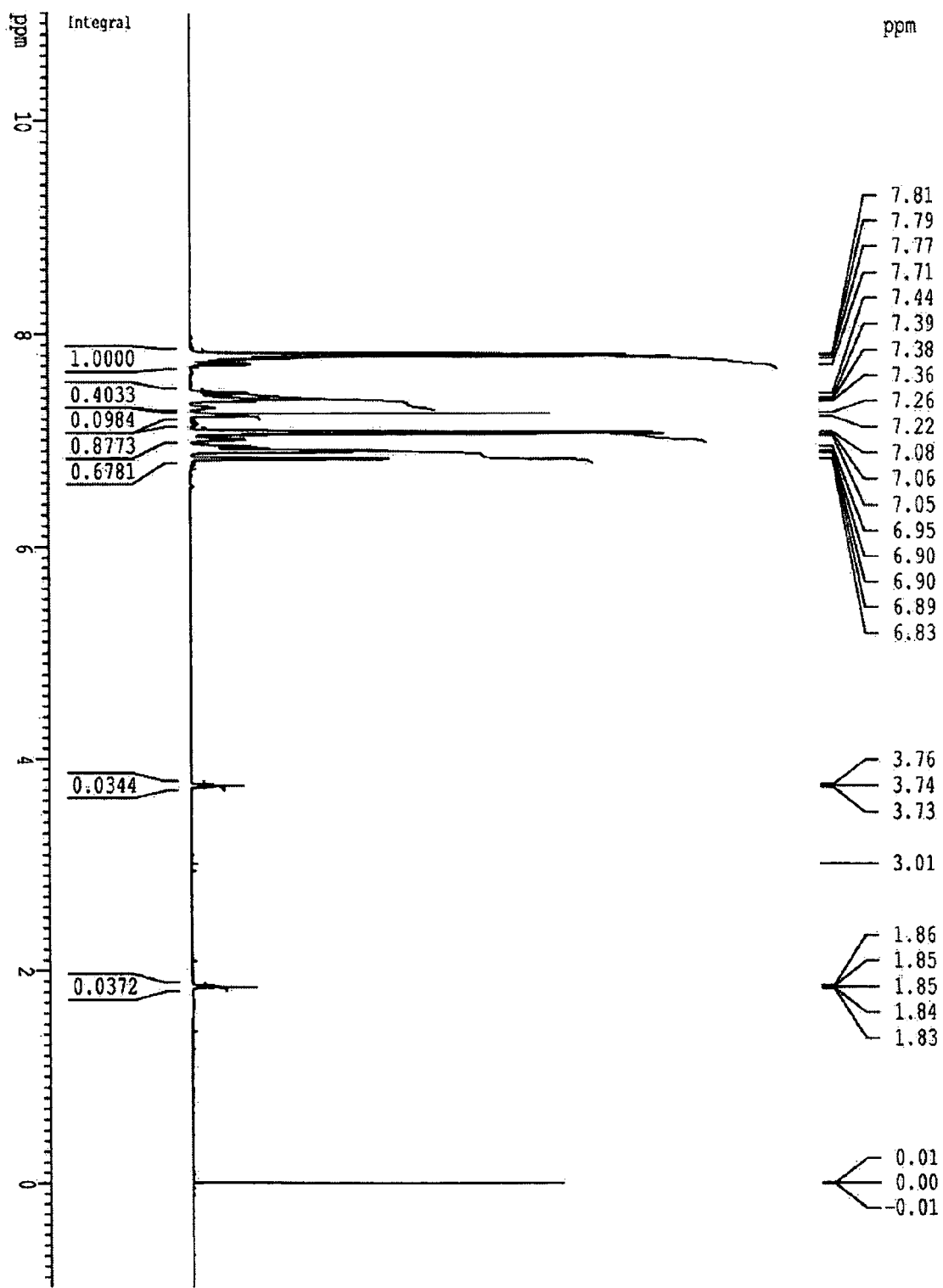
FIG. 3 shows the $^1$H-NMR spectra of the compound (1-2)
Figure 4:
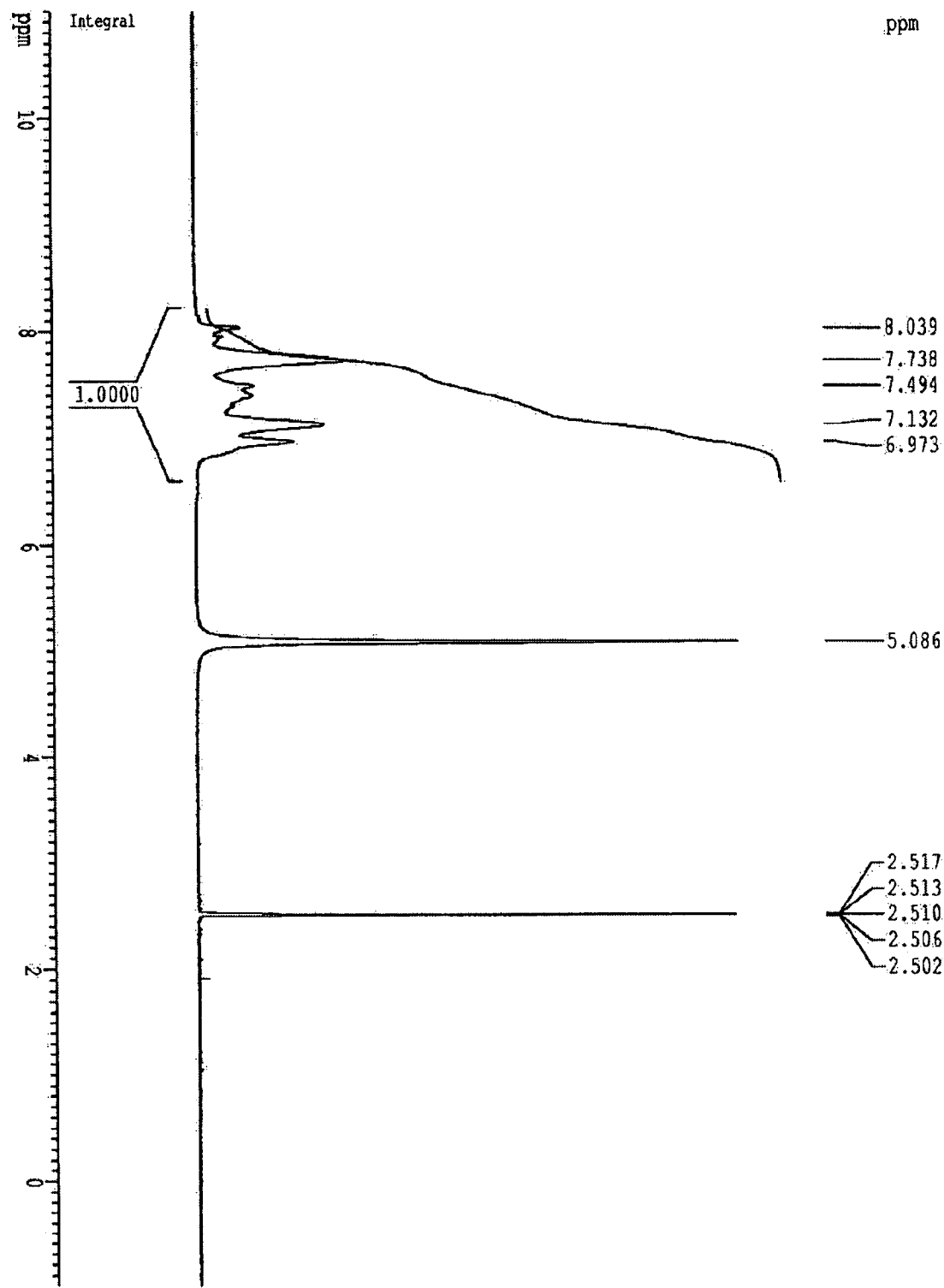
FIG. 4 shows the $^1$H-NMR spectra of the polyarylene (2)
Figure 5:
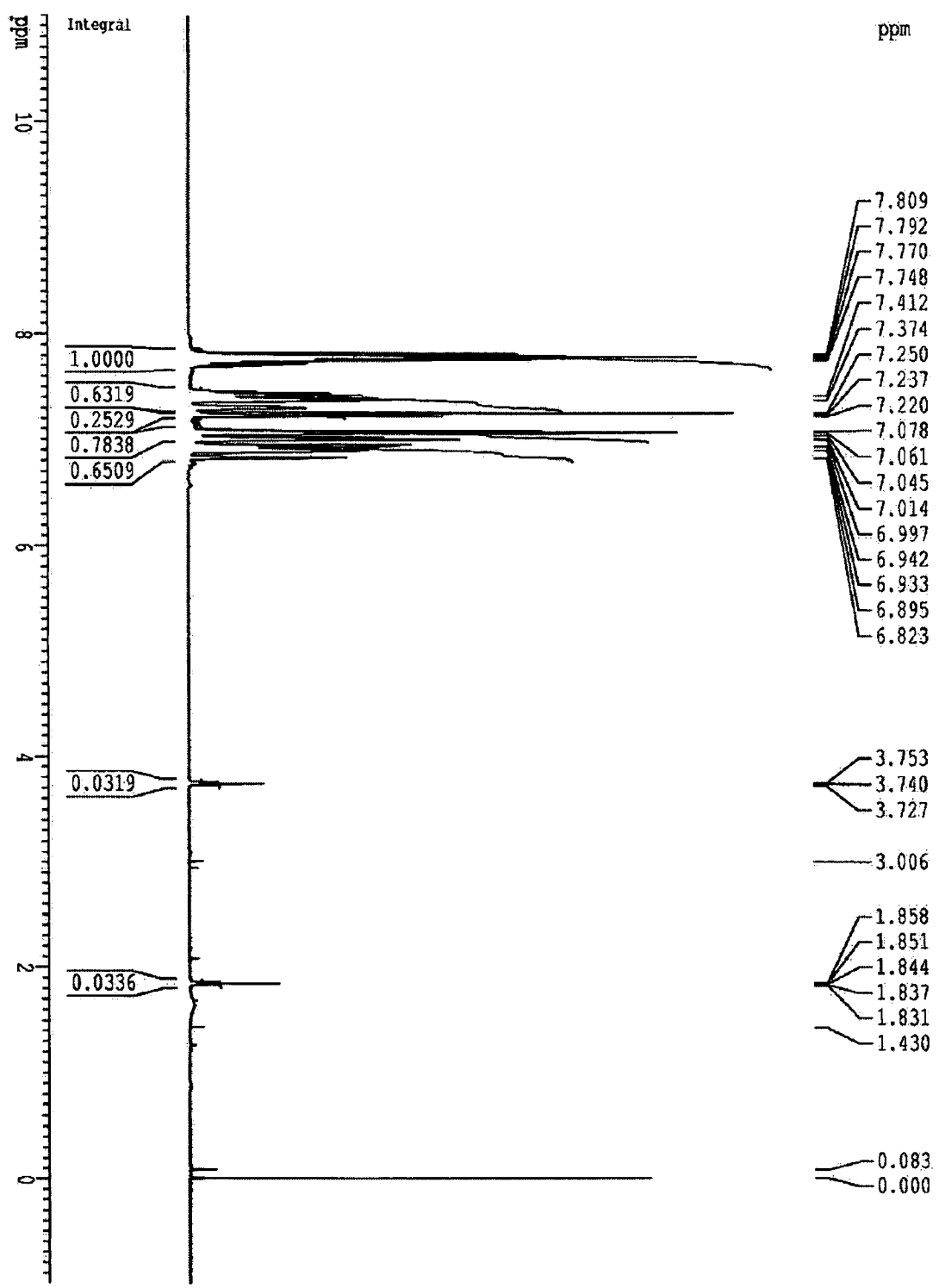
FIG. 5 shows the $^1$H-NMR spectra of the compound (1-3)
Figure 6:
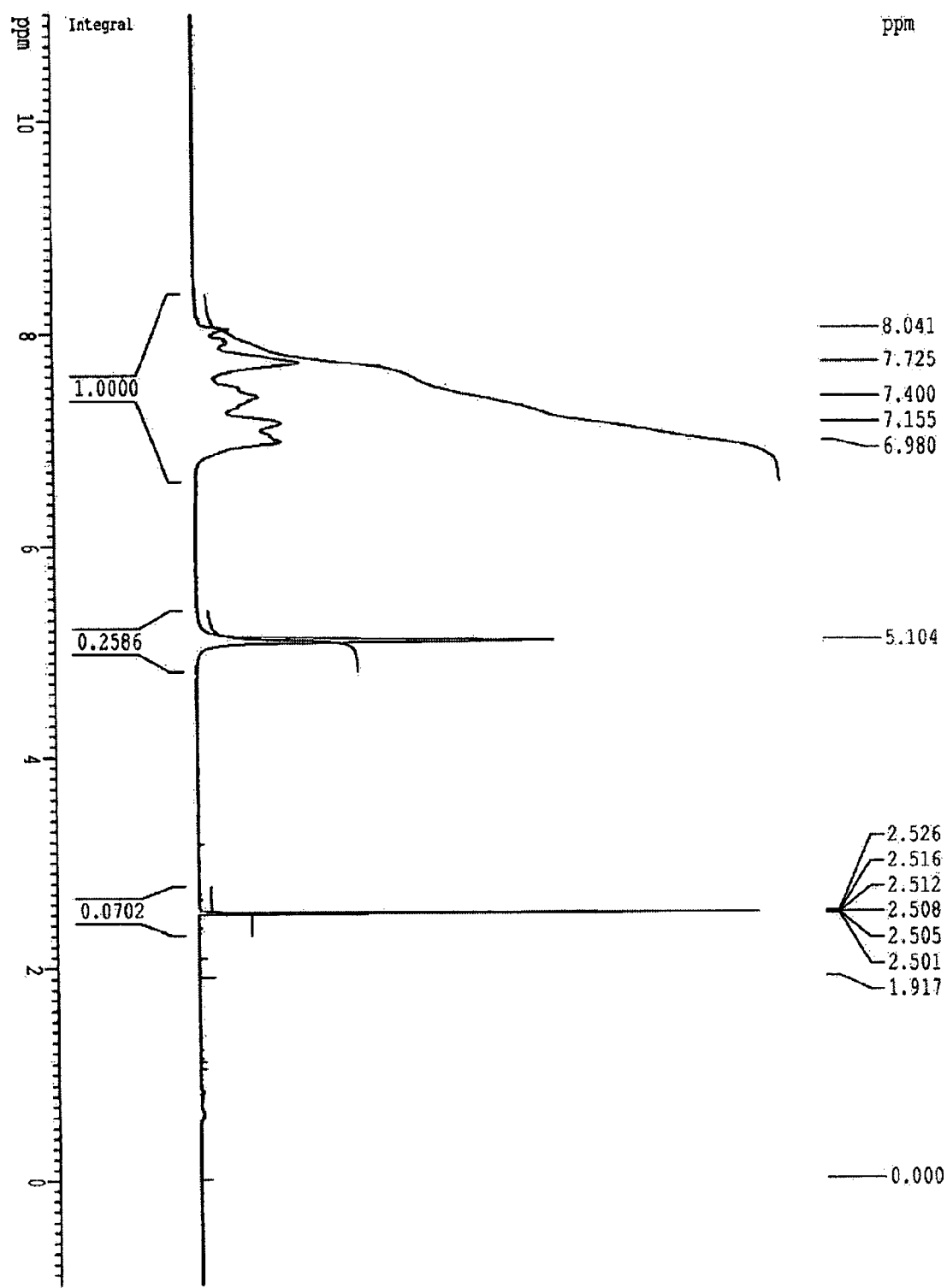
FIG. 6 shows the $^1$H-NMR spectra of the polyarylene (3).

26 g of the polyarylene having a sulfonic acid group (3) was obtained in the same manner as Example 1-2, except that 20.2 g (4.7 mmol) of the compound (1-3) obtained in Example 3-1 was used. The weight average molecular weight (Mw) of the resulting polymer was 115,000. FIG. 3 shows the $^1$H-NMR spectra of this polymer. The obtained polymer was presumed to include the constitutional units (S-3) to (U-3) expressed by the formulas described below, in which the ratio s3 of the constitutional unit (S-3) was 60 mole %, and the ratio t3 of the constitutional unit (T-3) was 40 mole %, based on the combined amount of the constitutional units (S-3) and (T-3). In addition, in the obtained polymer it was presumed that the combined ratio of the constitutional units (S-3) and (T-3) were 9 mole %, and the ratio of the constitutional unit (U-3) was 91 mole %, based on the overall total amount of constitutional units. The ion exchange capacity was 1.4 meq/g.

(S-3)

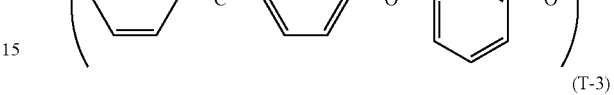
(T-3)

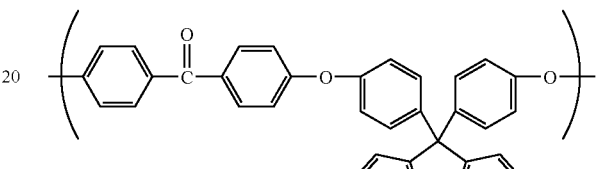

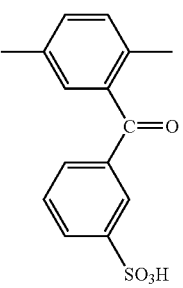
(U-3)

Example 3-3

Preparation of Proton Conductive Membrane (3) and Membrane-Electrode Assembly

The resulting polyarylene having a sulfonic acid group dissolved in 15 mass % of N-methylpyrrolidone (NMP) solution was casted onto a glass plate to prepare the proton conductive membrane (3) having a thickness of 40 μm. A membrane electrode assembly was prepared in the same manner as Example 1-3, except that the proton conductive membrane (3) of Example 3-3 was used.

Comparative Example 1-1

Synthesis of the Compound (1-4)

The reaction was performed in the same manner as Example 1-1 until CFBP was secondly added, except that 16.15 g (147 mmol) of Res, 29.09 g (133 mmol) of DFBP, 5.94 g (25 mmol) of CFBP, and 24.32 g (176 mmol) of potassium carbonate were added to a 3 L separable four-necked flask, and then 175 mL of DMAc and 70 mL of toluene were added. 3.44 g (15 mmol) of CFBP was added, followed by stirring at 160 to 165 degrees Celsius for another 3 hours. Afterwards, the resulting product was treated in the same manner as Example 1-1 to obtain 40 g of the intended product, which is the compound (1-4), in a yield of 88%.

The compound (1-1) had a number molecular weight of 5500 and a weight molecular weight of 8250. In addition, this compound (1-4) includes the constitutional unit (S-4) expressed by the formula described below. Both ends of the compound (1-4) were chlorine atoms.

Comparative Example 1-2

Synthesis of Polyarylene Having Sulfonic Acid Group (4)

32 g of the polyarylene having a sulfonic acid group (4) was obtained in the same manner as Example 1-2, except that 25.7 g (4.7 mmol) of the compound (1-4) obtained in Comparative Example 1-1 was used. The weight average molecular weight (Mw) of the resulting polymer was 135,000. The obtained polymer was presumed to include the constitutional units (S-4) and (U-4) expressed by the formulas described below, in which the ratio of the constitutional unit (S-4) was 9 mole % and the ratio of the constitutional unit (U-4) was 91 mole %, based on the overall total amount of constitutional units. The ion exchange capacity was 1.2 meq/g.

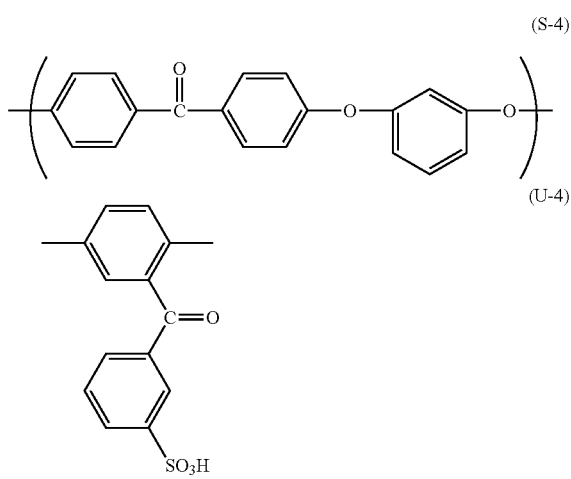

Comparative Example 1-3

Preparation of Proton Conductive Membrane (4) and Membrane-Electrode Assembly

The resulting polyarylene having a sulfonic acid group (4) dissolved in 15 mass % of N-methylpyrrolidone (NMP) solution was casted onto a glass plate to prepare the proton conductive membrane (4) having a thickness of 40 μm. A membrane electrode assembly was prepared in the same manner as Example 1-3, except that the proton conductive membrane (4) of Comparative Example 1-3 was used.

Comparative Example 2-1

Synthesis of the Compound (1-5)

The reaction was performed in the same manner as Example 1-1 until CFBP was secondly added, except that 51.39 g (147 mmol) of BPFL, 0 g (0 mmol) of Res, 29.09 g (133 mmol) of DFBP, 5.94 g (25 mmol) of CFBP, and 24.32 g (176 mmol) of potassium carbonate were added into a 3 L separable four-necked flask, and then 175 mL of DMAc and 70 mL of toluene were added. 3.44 g (15 mmol) of CFBP was added, followed by stirring at 160 to 165 degrees Celsius for another 3 hours. Afterwards, the resulting product was treated in the same manner as Example 1-1 to obtain 70 g of the intended product, which is the compound (1-5), in a yield of 87%.

The compound (1-5) had a number molecular weight of 3500 and a weight molecular weight of 5250. In addition, this compound (1-5) includes the constitutional unit (T-5) expressed by the formula described below. Both ends of the compound (1-5) were chlorine atoms.

Comparative Example 2-2

Synthesis of Polyarylene Having Sulfonic Acid Group (5)

25 g of the polyarylene having a sulfonic acid group (5) was obtained in the same manner as Example 1-2, except that 16.2 g (4.6 mmol) of the compound (1-5) obtained in Comparative Example 2-1 was used. The weight average molecular weight (Mw) of the resulting polymer was 105,000. The obtained polymer was presumed to include the constitutional units (T-5) and (U-5) expressed by the formulas described below, in which the ratio of the constitutional unit (T-5) was 9 mole % and the ratio of the constitutional unit (U-5) was 91 mole %, based on the overall total amount of constitutional units. The ion exchange capacity was 1.6 meq/g.

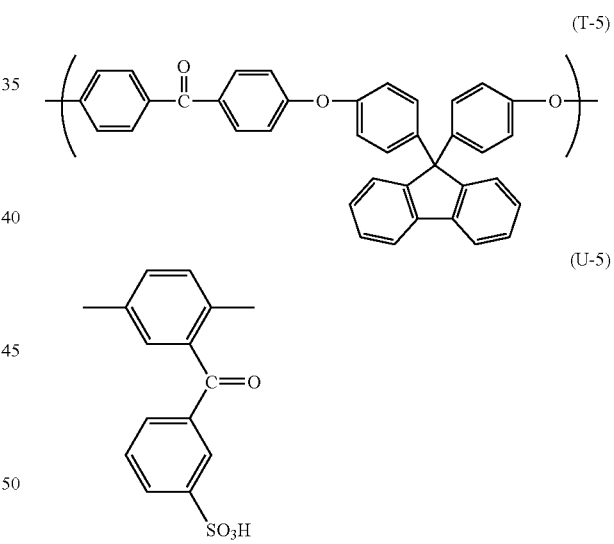

Comparative Example 2-3

Preparation of Proton Conductive Membrane (5) and Membrane-Electrode Assembly

The resulting polyarylene having a sulfonic acid group dissolved in a 15 mass % N-methylpyrrolidone (NMP) solution was casted onto a glass plate to prepare the proton conductive membrane (5) having a thickness of 40 μm. A membrane electrode assembly was prepared in the same manner as Example 1-3, except that the proton conductive membrane (5) of Comparative Example 1-3 was used.

Physical Property Evaluation

Physical property evaluation of the proton conductive membranes (1) to (5) obtained in Examples 1-3 to 3-3 and Comparative Examples 1-3 and 2-3 was carried out as described below. These results are summarized in Table 1.

Methanol/Water Solution Immersion Test

The proton conductive membranes were immersed in a 64 mass % methanol water solution at 60 degrees Celsius for 6 hours. Areas before and after immersion were measured to calculate area change rate (%) in accordance with the expression (1) described below.

$$\text{Area Change Rate (\%)} = (\text{Area before Immersion}/\text{Area after Immersion}) \times 100 \, (\%) \quad (1)$$

Methanol Permeability

Methanol permeability of the proton conductive membrane was measured by way of pervaporation method. The proton conductive membranes were set in predetermined cells, a 30 mass % methanol water solution was supplied to the front side, and the permeation was trapped from the rear side by liquid nitrogen at reduced pressure. The amount of methanol permeation was determined in accordance with the expression (2) described below.

$$\text{Amount of Methanol Permeation}(g/m^2/h) = \{\text{Permeation Weight } (g)/\text{Collection Time } (h)/\text{Sample Area } (m^2)\} \times \text{Concentration of Methanol in Permeation} \quad (2)$$

Membrane Resistance Measurement

Conductive carbon boards were placed on upper and lower sides of the proton conductive membranes in a 1 mol/L sulfuric acid to measure the AC resistance of the proton conductive membranes between carbon boards at room temperature. The membrane resistances of the proton conductive membranes were determined in accordance with the expression (3) described below.

$$\text{Membrane Resistance } (\Omega \cdot cm^2) = \{\text{Resistance between Carbon Boards } (\Omega) - \text{Blank Value } (\Omega)\} \times \text{Contact Area } (cm^2) \quad (3)$$

The CCM of the present invention was placed in a thermal shock chamber with humidity (DCTH-200 produced by ESPEC CORP.), and then a cool/heat test (−20 degrees Celsius/85 degrees Celsius at 95% RH) was performed 200 times. After the test, the CCM was cut in a 1.0 cm ×5.0 cm strip, and fixed on both sides of an aluminum plate to obtain a test piece. Furthermore, a tape was attached to the exposed electrode sides and pulled from opposite directions 180 degrees apart at a rate of 50 mm/min, and then the electrodes were stripped off the CCM. The tape was stripped by using an SPG load measuring device HPC.A50.500 made by HOKO ENGINEERING CO., LTD. For the sample after the stripping test, the area of the remaining electrodes was calculated by way of image processing, and the electrode adhesion rate was determined by the expression (4) described below. Image processing was performed by scanning an image with a scanner GT-8200UF produced by SEIKO EPSON CORPORATION, followed by bi-tonal digitizating the scanned image.

$$\text{Electrode Adhesion Rate (\%)} = \text{Electrode Remaining Area}/\text{Total Sample Area} \quad (4)$$

Evaluation of Power Generation Property

A membrane-electrode assembly according to the present invention was evaluated with respect to the power generation properties under the conditions where the temperature was 70 degrees Celsius, the relative humidity was 100% on both the fuel electrode side and the oxygen electrode side, and the current density was 0.1 A/cm². Pure hydrogen was supplied to the fuel electrode side and air was supplied to the oxygen electrode side. The durability was evaluated under the power generation conditions where the cell temperature was 105 degrees C., the current density was 0.1 A/cm², and the relative humidity was 70% on both the fuel electrode side and the oxygen electrode side; the time period up to when cross-leak occurred was measured. Durable periods for power generation of 300 hours or more were considered to be "satisfactory", while periods of less than 300 hours were considered to be "unsatisfactory".

TABLE 1

|  |  | Example 1-3 | Example 2-3 | Example 3-3 | Comparative Example 1-3 | Comparative Example 2-3 |
|---|---|---|---|---|---|---|
| Ion Exchange Capacity | meq/g | 1.3 | 1.2 | 1.4 | 1.2 | 1.6 |
| Area Change Rate | % | 140 | 150 | 130 | 210 | 110 |
| Amount of Methanol Permeation | g/m²/h | 200 | 250 | 150 | 300 | 130 |
| Membrane Resistance | Ω·cm² | 0.20 | 0.15 | 0.23 | 0.12 | 0.25 |
| Tg | degrees Celsius | 160 | 140 | 170 | 100 | 280 |
| Electrode Adhesion Rate | % | 95 | 100 | 90 | 100 | 0 |
| Power Generation Performance (0.1 A/cm²) | V | 0.79 | 0.80 | 0.78 | 0.81 | No Power Generation |
| Power Generation Durability | — | Satisfactory | Satisfactory | Satisfactory | Unsatisfactory | — |

According to the Examples, by using the polyarylene having the specific ratio of the specific structure as the proton conductive membrane, the adhesiveness of the membrane-electrode interface is improved by way of heat processing treatment, such as hot pressing, so that a membrane-electrolyte assembly is produced exhibiting superior power generation performance and power generation durability at low critical current density.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A membrane-electrode assembly for solid polymer electrolyte fuel cells, comprising: an anode electrode, a cathode electrode, and a proton conductive membrane, the anode electrode and the cathode electrode being disposed on opposite sides of the proton conductive membrane, wherein the proton conductive membrane includes a polyarylene having the constitutional unit (S) expressed by the general formula (2-2) described below and the constitutional unit (T) expressed by the general formula (2-3) described below; the ratio s of the unit (S) in the polyarylene is 50 to 95 mole %, and the ratio t of the unit (T) is 5 to 50 mole % in the polyarylene, where s+t=100 mole %,

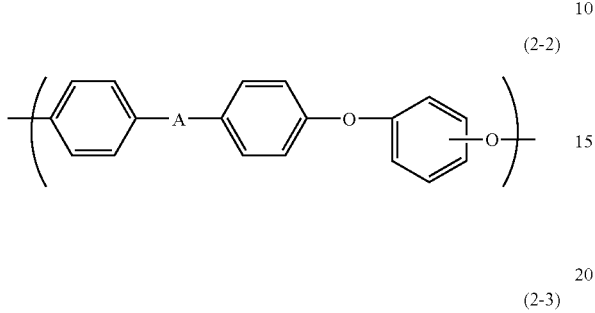

(2-2)

(2-3)

in which, A independently represents at each occurrence independently a divalent linking group expressed by —CO— or —SO$_2$—, and R$^1$ to R$^4$ independently represent at each occurrence a hydrogen atom, fluorine atom, alkyl group, or aryl group.

2. The membrane-electrode assembly for solid polymer electrolyte fuel cells according to claim 1, wherein the polyarylene further includes the constitutional unit (U) expressed by the general formula (3-3) described below:

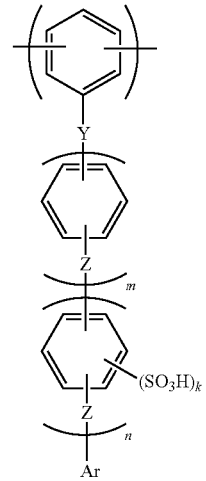

(3-3)

in which, Y represents at least one kind of divalent linking group selected from the group consisting of —CO—, —SO$_2$—, —SO—, —CONH—, —COO—, —(CF$_2$)$_p$— (p is an integer from 1 to 10) and —C(CF$_3$)$_2$—; Z independently represents at each occurrence a direct bond or at least one kind of divalent linking bond selected from the group consisting of —O—, —S—, —(CH$_2$)$_p$— (p is an integer from 1 to 10), and —C(CH$_3$)$_2$—; Ar represents an aromatic group having a sulfonate group; m represents an integer from 0 to 10; n represents an integer from 0 to 10; and k represents an integer from 1 to 4.

3. The membrane-electrode assembly for solid polymer electrolyte fuel cells according to claim 1, wherein the polyarylene has a number average molecular weight of 500 to 50000, and a weight average molecular weight of 2000 to 600000.

4. The membrane-electrode assembly for solid polymer electrolyte fuel cells according to claim 2, wherein the polyarylene has 0.001 to 90 mole % of the constitutional unit (U) based on the overall total amount of constitutional units.

* * * * *